United States Patent
Belleau et al.

[15] 3,691,231
[45] Sept. 12, 1972

[54] NEW PROCESS FOR THE PREPARATION OF 1-INDANCARBOXYLIC ACIDS

[72] Inventors: Bernard R. Belleau, Westmount; Gerry Kavadias, St. Lambert, Quebec, both of Canada

[73] Assignee: Bristol-Myers Company, New York, N.Y.

[22] Filed: Dec. 13, 1971

[21] Appl. No.: 207,625

[52] U.S. Cl............260/523 R, 260/284, 260/348 A, 260/501.1, 260/515 R, 260/599
[51] Int. Cl................................................C07c 63/00
[58] Field of Search......................260/515 R, 523 R

[56] References Cited

OTHER PUBLICATIONS

Johnson et al. Jour. Amer. Chem. Soc. (1953), Vol. 75, pages 4995– 5001.
Wagner et al. Synthetic Organic Chemistry, (1959) page 419, John Wiley and Sons, Inc., New York

*Primary Examiner*—James A. Patten
*Attorney*—Herbert W. Taylor, Jr. et al.

[57] ABSTRACT

Levorotatory 5-cyclohexyl-1-indancarboxylic acid is a useful anti-inflammatory agent in the treatment of inflammatory diseases in animals, including man. As such, a new and more efficient process has been discovered for the preparation of large quantities of the racemic mixture of the compound, (±)-5-cyclohexyl-1-indancarboxylic acid.

6 Claims, No Drawings

3,691,231

NEW PROCESS FOR THE PREPARATION OF 1-INDANCARBOXYLIC ACIDS

BACKGROUND OF THE INVENTION

1. Field of the Invention

The process of the present invention is a new and more efficient procedure for the preparation of large quantities of (±)-5-cyclohexyl-1-indancarboxylic acid.

2. Description of the Prior Art

The process of the present invention is new and novel and produces yields several fold those obtained by the process described in U.S. Pat. No. 3,565,943.

The art we are acquainted with that is most closely related to that of the process of the instant invention can be found in the following references:

A. L. Claisen, Berichte 38, 693 (1905) reports the condensation of ketones with esters in the presence of sodamide (Claisen ester condensation).

B. W. Johnson et al., J. Am. Chem. Soc., 75, 4995 (1953) reports the condensation of ketones with α-chloroacetic acid esters in the presence of potassium t-butoxide to produce 1, α-epoxyacetate esters, and their subsequent conversion to the corresponding aldehyde.

C. C. Djerassi et al., J. Org. Chem., 21, 1549 (1956) reports the oxidation of Δ⁵-3-steroidal alcohols to the Δ⁵-3-steroidal ketone using chromium trioxide in acetone.

D. P. F. Juby, R. A. Partyka and T. W. Hudyma, U. S. Pat. No. 3,565,943, report the preparation of (±)-5-cyclohexyl-1-indancarboxylic acid.

SUMMARY OF THE INVENTION

This invention is a new and novel process for the preparation of the compound having the formula

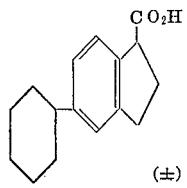

(±)  I which process comprises the consecutive steps of

A. Treating the compound having the formula

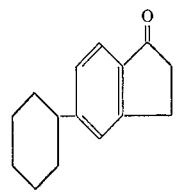

II with ethyl chloroacetate and potassium tertiary butoxide to produce the compound having the formula

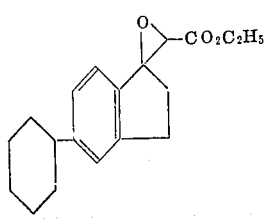

III

B. treating 1 mole of compound III with either 1 mole of sodium ethoxide and 1 mole of water in ethanol or 1 mole of potassium t-butoxide and 1 mole of water in t-butanol to produce the compound having the formula

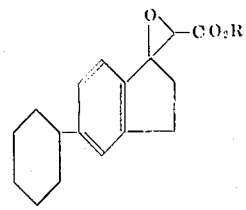

IV in which R is sodium or potassium;

C. dissolving compound IV in glacial acetic acid to produce the compound having the formula

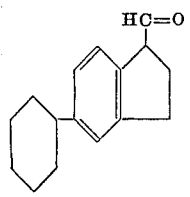

V and

D. stoichiometrically oxidizing compound V with chromium trioxide in concentrated sulfuric acid and water in acetone.

DISCLOSURE OF THE INVENTION

This invention relates to a new and novel and more efficient process for the preparation of nonsteroidal anti-inflammatory agents having the name (±)-5-cyclohexyl-1-indancarboxylic acid, and more particularly the compound (−)-5-cyclohexyl-1-indancarboxylic acid which is the more potent isomer (U. S. Pat. No. 3,575,943).

The compounds produced by the process are characterized by the formula

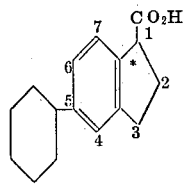

The carbon to which the carboxyl group is attached is an asymmetric carbon atom (*) such that the compounds exist in two isomeric forms; dextro- and levorotatory isomers. Of these two isomers, the levoratory isomer is the most potent isomer as an anti-inflammatory agent. However, the dextrorotatory isomer is also of importance inasmuch as it can be racemized to produce the desired levorotatory isomer.

It was an object of the instant invention to provide a new, novel and more efficient process for the preparation of these compounds, said compounds being useful in the treatment of a variety of inflammatory diseases such as rheumatoid arthritis, rheumatoic spondylitis, osteoarthritis, gout and other similar afflictions.

The process of the instant invention can be illustrated by the following diagram.

Step A

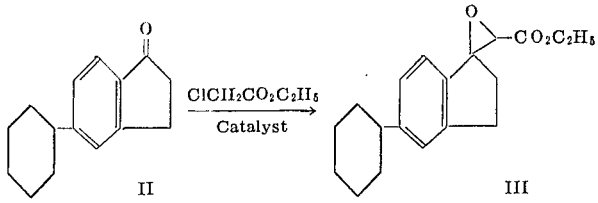

Step B

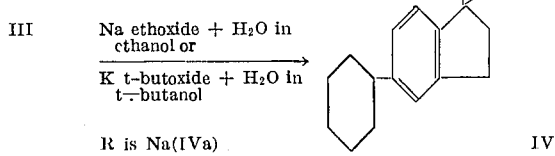

Step C

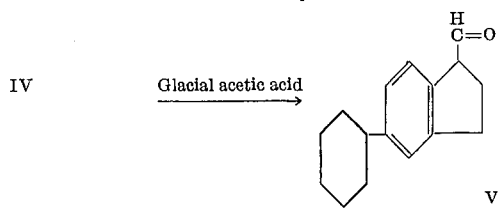

Step D

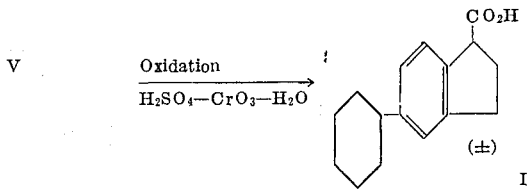

The objectives of the present invention have been achieved by the provision of the process which comprises the consecutive steps of A. treating 1 mole of the compound having the formula

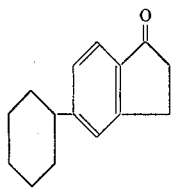

with at least 1 mole of ethyl chloroacetate, but preferably 1.1 to 1.8 mole, and most preferably 1.4 to 1.6, and at least 1 mole of potassium tertiary butoxide, but preferably 1.1 to 1.8 mole, and most preferably 1.4 to 1.6 mole, in tertiary butanol at a temperature below 30° C., and preferably in a range of 0° to 25° C., to produce the compound having the formula

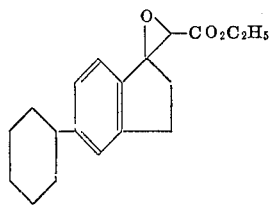

B. treating 1 mole of compound III with 1 mole of sodium ethoxide and 1 mole of water in absolute ethanol or 1 mole of K-t-butoxide and 1 mole of water in t-butanol, , at a temperature below 30° C., and preferably in a range of about 0° C. to about 25° C. in a (lower)alkanol, but preferably ethanol, n-propanol, isopropanol, m-butanol, sec-butanol or t-butanol, and most preferably ethanol or t-butanol, to produce the compound having the formula

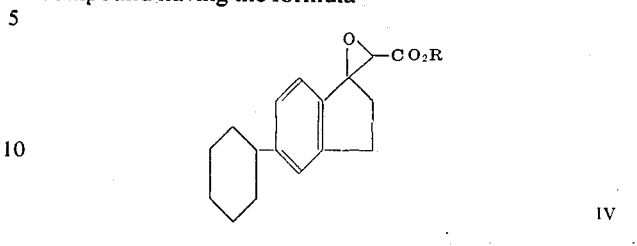

in which R is Na or K;

C. dissolving compound IV in glacial acetic acid, with the aid of heat, preferably at about reflux temperature to produce the compound having the formula

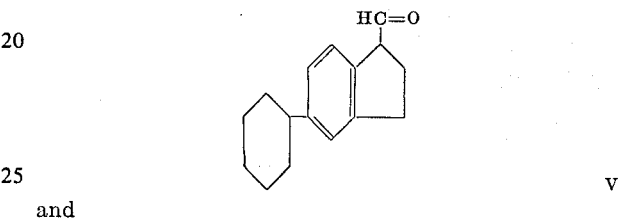

and

D. stoichiometrically oxidizing a solution of V in acetone with a solution of chromium trioxide, concentrated sulfuric acid and water at a temperature of about 10° C. to about 15° C., but preferably about 0° C. to about 5° C. to produce compound I.

The resolution of (±)-5-cyclohexyl-1-indancarboxylic acid can be accomplished according to the following procedure:

A. (±)-5-Cyclohexyl-1-indancarboxylic Acid: A solution of (±)-5-cyclohexyl-1-indancarboxylic acid (15.0 grams, 0.0614 mole) and cinchonidine (9.05 grams, 0.037 mole) in absolute ethanol (700 ml.) was boiled down to a volume of about 300 ml. The mixture was allowed to cool slowly and was left for 20 hours at 25° C. The colorless crystals were collected and washed with cold ethanol to give the cinchonidine salt of (+)-5-cyclohexyl-1-indancarboxylic acid (13.0 grams), m.p. 212°–212.5° C. Additional cinchonidine (1.0 gram, 0.0034 mole) was added to the mother liquors and their volume reduced to about 165 ml. by boiling. The hot solution was seeded with the salt of the (+) acid and stored at 5° B. for 65 hours, when an additional crop (2.4 grams) of the cinchonidine salt of the (+) acid, m.p. 211°–215° C. was obtained. The mother liquors were retained for isolation of the (−) isomer.

The salt with m.p. 212°–212.5° C. was recrystallized from ethanol to give colorless crystals (11.8 grams), m.p. 217.5°–219° C. The product was partitioned between ether (500 ml.) and 10 percent aqueous hydrochloric acid (250 ml.) and water saturated with sodium chloride (250 ml.). The ethereal solution was dried ($Na_2SO_4$), filtered, and the filtrate reduced to dryness to give (+)-5-cyclohexyl-1-indancarboxylic acid (5.5 grams), m.p. 108°–110° C. Two recrystallizations from petroleum ether (b.p. 39°–50° C.), gave colorless needles, m.p. 108°–109.5° C., $[\alpha]_D^{25}$ +9.60° (ethanol) and $[\alpha]_{365}^{25}$ +44.8° (ethanol).

Anal. calc'd. for $C_{16}H_{20}O_2$(percent): C, 78.65; H, 8.25.

Found: C, 78.40; H, 8.27.

B. (−)-5-Cyclohexyl-1-indancarboxylic Acid: The mother liquors from the salt formation in part A. were reduced to dryness and the residue treated with ether and 10 percent aqueous hydrochloric acid as previously described for the salt of the (+) isomer and from the ethereal layer was obtained a partially resolved mixture of acids (7.6 grams), enriched in the (−) isomer, $[\alpha]_D^{25}$ −7.69° (ethanol) and $[\alpha]_{365}^{25}$ −35.4° (ethanol). This mixture was extracted with boiling petroleum ether (b.p. 39°–50° C., 3 × 35 ml.) and the combined extracts were reduced in volume (50 ml.) and cooled in an ice bath. The crystalline solid (5.1 grams), m.p. 105°–108° C., $[\alpha]_D^{25}$ −8.91° (ethanol) and $[\alpha]_{365}^{25}$ −41.5° (ethanol) was collected.

The solution of this acid (5.02 grams, 0.0205 mole) and dehydroabietylamine (5.85 grams, 0.0205 mole) in ethanol (500 ml.) was boiled down to a volume of about 175 ml. and cooled to 25° C. during 2 hours. The dehydroabietylamine salt of (−)-5-cyclohexyl-1-indancarboxylic acid (8.7 grams), m.p. 179°–181° C., was collected and recrystallized from ethanol to give colorless crystals (8.0 grams), m.p. 184°–185° C. The mother liquors from the product with m.p. 179°–181° C., were reduced in volume and an additional crop of salt (0.95 gram), m.p. 178.5°–180.5° C., was isolated. This latter material was recrystallized from ethanol and the product (0.78 gram), m.p. 182°–183° C., was combined with the main crop. The dehydroabietylamine salt (8.78 grams) was partitioned between ether (400 ml.) and 10 percent aqueous hydrochloric acid. The ethereal solution was washed with water (3 × 150 ml.) followed by water saturated with sodium chloride (2 × 100 ml.), dried (Na$_2$SO$_4$), and reduced to dryness to leave the (−) isomer (4.0 grams). Recrystallization from petroleum ether (b.p. 39°–50° C.) gave colorless needles (3.41 grams) of (−)-5-cyclohexyl-1-indancarboxylic acid: m.p. 108°–109.5° C., $[\alpha]_D^{25}$ −9.66° (ethanol) and $[\alpha]_{365}^{25}$ −44.7° (ethanol).

Anal. calc'd. for $C_{16}H_{20}O_2$(percent): C, 78.65; H, 8.25.

Found: C, 78.85; H, 8.31.

A preferred embodiment of the present invention is the process for the preparation of compounds having the formula

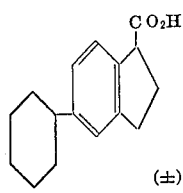

I which process comprises the consecutive steps of

A. treating 1 mole of the compound having the formula

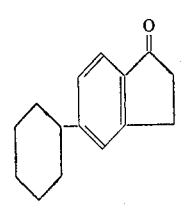

II with at least 1 mole of ethyl chloroacetate and at least 1 mole of potassium tertiary butoxide in tertiary butanol at a temperature below 30° C. to produce the compound having the formula

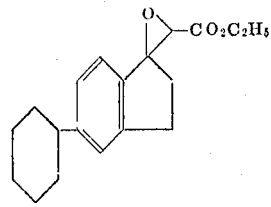

III;

B. treating 1 mole of compound III with 1 mole of sodium ethoxide and 1 mole of water in at a temperature below 30° C., to produce the compound having the formula

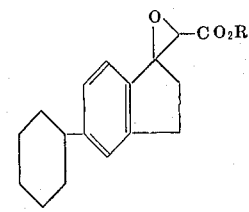

IV in which R is Na

C. dissolving compound IV in glacial acetic and with the aid of heat to produce the compound having the formula

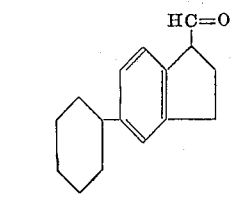

V;

and

D. stoichiometrically oxidizing a solution of V in acetone with a solution of chromium trioxide, concentrated sulfuric, acid and water, at a temperature of about −10° C. to about 15° C. to produce compound I.

Another preferred embodiment is the process for the preparation of compound I which comprises the consecutive steps of A. treating 1 mole of compound II with about 1.0 to 1.8 mole of ethyl chloroacetate and about 1.0 to 1.8 mole of potassium t-butoxide, in tertiary butanol, at a temperature in the range of about 0° C. to about 25° C. to produce compound III;

B. treating 1 mole of compound III with 1 mole of sodium ethoxide and 1 mole of water, in absolute ethanol, in a temperature range of about 0° C. to about 25° C. to produce compound IV, in which R is Na;

C. dissolving compound IV in glacial acetic acid, with the aid of heat, to produce compound V; and D. stoichiometrically oxidizing a solution of compound V in acetone with a solution of chromium trioxide, concentrated sulfuric acid and water at a temperature in the range of about −10° to 15° C. to produce compound I.

A most preferred embodiment is the process for the preparation of compound I which comprises the consecutive steps of A. treating 1 mole of compound II with 1.4 to 1.6 mole of ethyl chloroacetate and 1.4 to 1.6 mole of potassium tertiary butoxide, in t-butanol, in a temperature range of 0° to 25° C., to produce compound III;

B. treating 1 mole of compound III with 1 mole of sodium ethoxide and 1 mole of water, in absolute ethanol, in a temperature range of about 0° C. to about 25° C., to produce compound IV, in which R is Na;

C. dissolving compound IV in glacial acetic acid, at about reflux temperatures to produce compound V; and D. stoichiometrically oxidizing a solution of V in acetone with a solution of chromium trioxide, concentrated sulfuric acid and water at a temperature in the range of about 0° C. to about 5° C. to produce compound I.

Another preferred embodiment is the process for the preparation of compound I which comprises the consecutive steps of A. treating 1 mole of compound II with about 1.0 to 1.8 mole of ethyl chloroacetate and about 1.0 to 1.8 mole of potassium t-butoxide, in tertiary butanol, at a temperature in the range of about 0° C. to about 25° C. to produce compound III;

B. treating 1 mole of compound III with 1 mole of potassium tertiary butoxide and 1 mole of water, in t-butanol, in a temperature range of about 0° C. to about 25° C. to produce compound IV as a mixture in which R is K;

C. dissolving compound IV in glacial acetic acid, with the aid of heat, to produce compound V; and D. stoichiometrically oxidizing a solution of compound V in acetone with a solution of chromium trioxide, concentrated sulfuric acid and water at a temperature in the range of about −10° to 15° C. to produce compound I.

A most preferred embodiment is the process for the process for the preparation of compound I which comprises the consecutive steps of A. treating 1 mole of compound II with 1.4 to 1.6 mole of ethyl chloroacetate and 1.4 to 1.6 mole of potassium tertiary butoxide, in t-butanol, in a temperature range of 0° to 25° C., to produce compound III;

B. treating 1 mole of compound III with 1 mole of potassium tertiary butoxide and 1 mole of water, in tertiary butanol, in a temperature range of about 0° C. to about 25° C., to produce compound IV as a mixture in which R is K;

C. dissolving compound IV in glacial acetic acid, at about reflux temperatures to produce compound V; and D. stoichiometrically oxidizing a solution of V in acetone with a solution of chromium trioxide, concentrated sulfuric acid and water at a temperature in the range of about 0° C. to about 5° C. to produce compound I.

A further preferred embodiment is the process for the preparation of compound I which comprises the consecutive steps of A. treating 1 mole of compound II with 1.4 to 1.6 mole of ethyl chloroacetate and 1.4 to 1.6 mole of potassium tertiary butoxide, in t-butanol, in a temperature range of 0° to 25° C., to produce compound III;

B. treating 1 mole of compound III in situ with 1 mole of potassium tertiary butoxide and 1 mole of water, in tertiary butanol, in a temperature range of about 0° C. to about 25° C., to produce compound IV as a mixture in which R is K;

C. dissolving compound IV in glacial acetic acid, at about reflux temperatures to produce compound V; and D. stoichiometrically oxidizing a solution of V in acetone with a solution of chromium trioxide, concentrated sulfuric acid and water at a temperature in the range of about 0° C. to about 5° C. to produce compound I.

For the purpose of this disclosure, the term (lower)-alkanol is defined as an alcohol having one to six carbon atoms.

DESCRIPTION OF THE PREFERRED EMBODIMENTS

The carboxylic acid I was synthesized under three different experimental conditions.

Method A. (Example 1): In this method the intermediate products III, IV and V were separated and without purification were used in the next step. The hydrolysis of the glycidic ester III to the acid salt IV was performed by Claisen's[1] method, that is with sodium in ethanol containing one equivalent of $H_2O$. The overall yield of the acid was 45 percent m.p. 140°–145° C. or 42 percent m.p. 146°–148° C.

EXAMPLE 1

(A)

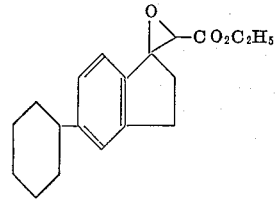

III

Into a 500 cc. 3-neck flask fitted with mechanical stirrer, dropping funnel and $N_2$ inlet tube was added 21.4 g. (100 mmole) 5-cyclohexyl-1-indanone (II) and 18.3 g. (150 mmole) ethylchloroacetate and the mixture was stirred under $N_2$ for 15 minutes at room temperature and then cooled in an ice-bath (4° C.). A solution of 1.68 g. (150 mmole) potassium tertiary butoxide (from Alpha Inorganics) in 180 cc. dry tertiary butanol (reagent grade distilled over $CaH_2$) was added dropwise in 1 hour 15 minutes. Keeping the inside temperature 7°–10° C. after the addition, the ice-bath was removed and the reaction mixture was stirred at room temperature for 2 hours 30 minutes. The excess of potassium tertiary butoxide was decomposed by passing carbon dioxide through the reaction mixture for 30 minutes. The solvent was removed in a rotary evaporator at 35°–40° C. The residue was mixed with celite, poured into a sintered glass funnel packed with celite and washed with ether. The ether solution was evaporated to dryness to give 27.0 g. (90 percent) of dark brown syrup (III).

(B)

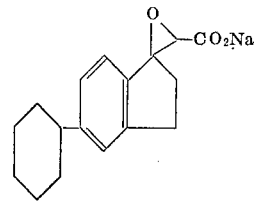

IVa

The crude ester III (27.0 g., 90 mmole) was dissolved in 10 cc. absolute ethanol and cooled in an ice-bath. When the temperature was 4° C., a solution made by dissolving 2.04 g. (89 mmole) of sodium in 35 cc. absolute ethanol and then adding 1.62 cc. (90 mmole) of water, was added all at once. The mixture was stirred in the ice-bath for 15 minutes and at room temperature for 3 hours 30 minutes. It was diluted with ethanol (50 cc.) and the solids were separated by filtration, washed with ether and dried to give 23.3 g. (79.5 percent based on II) crude IVa.

(C) 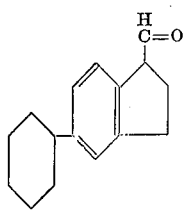

V

1-Formyl-5-Cyclohexylindane (V)

The dry solids (23.3 g.) IVa were placed in a flask and 35 cc. glacial acetic acid was added. Gas was evolved very fast and the temperature increased. It was stirred at room temperature for 15 minutes and then it was heated on a steam bath for 15 minutes. After it was cooled to room temperature, it was diluted with water (150 cc.) and extracted three times with ether (120 cc., 80 cc., 60cc.). The combined extracts washed with water (3 × 100 cc.) and with 10% $NaHCO_3$ dried ($MgSO_2$) and evaporated to dryness to give 14.7 g. (64.5 percent based on II) of the aldehyde V.

(D) 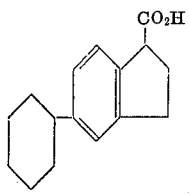

(+)-5-Cyclohexyl-1-Indancarboxylic Acid (I)

Preparation of the Jones Reagent. The method described by Djerassi et al.[2] was followed. Chromium trioxide, 26.72 g. (267.2 mmole) in 23 cc. concentrate sulfuric acid was cooled in ice and diluted by careful addition of water to 100 cc. volume.

Oxidation procedure. The aldehyde V, (14.7 g., 64.5 mmole) in 100 cc. acetone (reagent grade) was cooled in an ice-bath under stirring. When the temperature was 4° C., 17.0 cc. of Jones reagent was added from a burette in small portions as to keep the inside temperature at 20°–25° C. After the addition, 2–3 minutes, it was stirred in the ice-bath for 5 minutes. It was diluted with 300 cc. water and the crystalline precipitate was separated by filtration and washed on the funnel with water. The pale yellow crystals were dissolved in ether and the solution dried ($MgSO_4$) and evaporated to dryness to give 14.0 g. crystalline product. The aqueous phase on extraction with ether gave 390 mg. product (partly crystalline, partly syrup). The crystalline product, 14.0 g., was recrystallized from petroleum ether (65°–75° C.) [essentially n-hexane] to give 10.0 g. m.p. 142°–145° C. The mother liquor was combined with the fraction (390 mg.) from the extraction of the aqueous phase and evaporated to dryness. Recrystallized from petroleum ether gave 1.0 g. m.p. 140°–145° C. Total 11.0 g. (45 percent). Recrystallization from benzene (20 cc.) petroleum ether (200 cc.) gave 10.2 g. (42 percent based on II) m.p. 146°–148° C.

Method B. (Example 2): The glycidic ester III was prepared as in Method A but was not isolated. It was converted to the potassium salt by adding to the reaction mixture an equimolar amount of potassium tertiary butoxide and an equimolar amount of $H_2O$. The potassium salt IV was separated and converted to the acid as in Method A. The overall yield of acid I was 45 percent m.p. 135°–145° C. and 33 percent m.p. 147°–148° C. In this experiment there was isolated an appreciable quantity of IVc resulting from transesterification of of III. Incomplete hydrolysis of the ester is the main reason of the low yield of I in this experiment.

EXAMPLE 2

A. Glycidic Ester III. Into a 250 cc. three-neck flask fitted with mechanical stirrer, dropping funnel and Nitrogen inlet tube was added 10.7 g. (50 mmole) 5-cyclohexyl-1-indanone (II) and 9.2 g. (75 mmole) ethyl chloroacetate and the mixture was stirred under nitrogen at room temperature for 15 minutes and then cooled in an ice-bath (4° C.). A solution of 8.4 g. (75 mmole) potassium tertiary butoxide in 90 cc. dry tertiary butanol was added dropwise in 1 hour 15 minutes, keeping the temperature at 7°–10° C. After the addition the ice-bath was removed and stirring at room temperature continued for 2 hours 30 minutes.

(B) 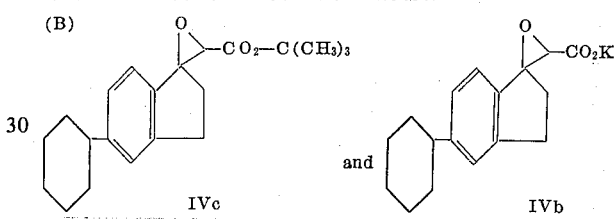

Hydrolysis of the Ester III. To the above stirred mixture was added 5.6 g. (50 mmole) potassium tertiary butoxide and cooled in an ice-bath. Water, 1.35 cc. (75 mmole) was added followed by addition of 20 cc. tertiary butanol. The ice-bath was removed and stirring at room temperature continued for 15–20 minutes. After this time, stirring was difficult because the reaction mixture was a thick paste. Stirring discontinued and allowed to stay at room temperature overnight (17 hours). The solvent was removed on a rotary evaporator at 45° C. The dry solids were treated with ether (150 cc.) and filtered through a sintered glass funnel. The filtrate after evaporation gave a crystalline product, 1.9 g. identified as the tertiary butyl ester of the glycidic acid (IVc).

C. 1-Formyl-5-Cyclohexylindane V. The dry solids (potassium salt of glycidic acid, IVb) were treated with 25 cc. glacial acetic acid and stirred first at room temperature for 15 minutes and then on a steam bath for 15 minutes. After cooling to room temperature the reaction mixture was diluted with water (120 cc.) and extracted with ether (100 cc., 50 cc., 50 cc.). The ether solution was washed with water (3 × 60 cc.) and with 10% $NaHCO_3$ (2 × 70 cc.). After drying, it was evaporated to dryness to give 8.7 g. (76 percent) crude V.

D. 5-Cyclohexyl-1-Indanecarboxylic Acid (I). The crude aldehyde V (8.7 g.) was dissolved in 100 cc. acetone (reagent grade) and the solution cooled in an ice-bath under stirring. When the temperature was 4° C., 13.0 cc. Jones reagent was added in (1 minute) and stirred for 5 minutes. It was diluted with water (300 cc.) and extracted with ether (3 × 100 cc.). The ether solution washed with water, dried (MgSO₄) and evaporated to dryness to give a crystalline product. It was boiled with 350 cc. petroleum ether (65°–75° C.), filtered to remove some insoluble matter and allowed to crystallize. The crystalline material was filtered to give 4.5 g. m.p. 138°–145° C. The mother liquor was concentrated by evaporation to a volume of about 50 cc. and allowed to crystallize. The crystalline product was separated to give 1.0 g. m.p. 135°–145° C. Total 5.5 g. (45 percent). The two crops were combined and recrystallized from ethyl acetate (10 cc.) petroleum ether (50 cc.) to give 4.0 g. (33 percent) m.p. 147°–148° C. of compound I.

Method C. (Example 3): The glycidic ester III was prepared as in Examples 1 and 2 and without separation it was hydrolyzed to the potassium salt by adding to the reaction mixture one equivalent of potassium tertiary butoxide and one equivalent of water. The solvent was removed by evaporation and the residue containing the potassium salt of the glycidic acid was converted to the aldehyde V by treatment with glacial acetic in the same reaction flask. The overall yield of the acid I was 45 percent m.p. 135°–145° C. and 33 percent m.p. 147°–148° C.

EXAMPLE 3

A. Glycidic Ester III: The product was prepared by the identical procedure as employed in example 2, part A.

B. Hydrolysis of Ester III: Potassium t-butoxide (5.6 g., 50 mmole) was added with stirring to the above reaction mixture (A) and the cooled in an ice bath. Water, 1.35 cc. (75 mmole) was added followed by the addition of 20 cc. tertiary butanol. The ice-bath was removed and the reaction mixture was stirred at room temperature for 20 minutes and then it was allowed to stay at room temperature overnight (17 hours). The solvent was removed by evaporation at 45° C. to yield compounds IV.

C. 1-Formyl-5-Cyclohexylindane V. To the above dry solids was added 25 cc. glacial acetic acid and the mixture stirred at room temperature for 15 minutes and then heated on the steam bath for 15 minutes. After cooling to room temperature, it was diluted with water (120 cc.) and extracted with ether (100 cc., 50 cc., 50 cc.). The ether solution was washed with water (3 × 60 cc.) and with 10% NaHCO₃ (2 × 70 cc.), dried and evaporated to dryness to give 10.4 g. crude V.

D. (±)-5-Cyclohexyl-1-Indanecarboxylic acid I. The crude aldehyde V in 100 cc. acetone was oxidized with 13.0 cc. Jones reagent as in Example 2, part C. The crude acid I was treated with boiling petroleum ether (500 cc.) and the solution was filtered to remove some insoluble matter and then it was allowed to crystallize to give 5.6 g. m.p. 132°–138° C. Recrystallization from ethyl acetate (10 cc.) petroleum ether (50 cc.) gave 4.0 g. (33 percent) m.p. 147°–148° C. of compound I.

We claim:

1. The process for the preparation of compounds having the formula

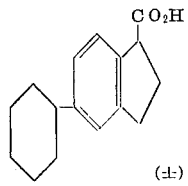

I which process comprises the consecutive steps of

A. treating 1 mole of the compound having the formula

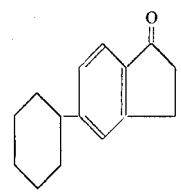

II with at least 1 mole of ethyl chloroacetate and at least 1 mole of potassium tertiary butoxide in tertiary butanol at a temperature below 30° C. to produce the compound having the formula

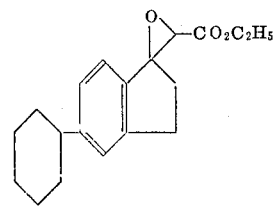

III

B. treating 1 mole of compound III with 1 mole of sodium ethoxide and 1 mole of water in absolute ethanol at a temperature below 30° C. to produce the compound having the formula

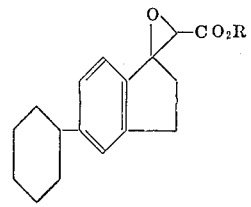

IV in which R is Na;

C. dissolving compound IV in glacial acetic acid with the aid of heat to produce the compound having the formula

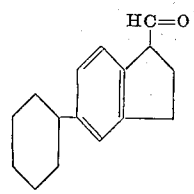

V;

and

D. stoichiometrically oxidizing a solution of V in acetone with a solution of chromium trioxide, concentrated sulfuric acid and water, at a temperature of about −10° C. to about 15° C. to produce compound I.

2. The process of claim 1 which comprises the consecutive steps of

A. treating 1 mole of compound II with about 1.0 to 1.8 moles of ethyl chloroacetate and about 1.0 to 1.8 moles of potassium t-butoxide, in tertiary butanol, at a temperature in the range of about 0° C. to about 25° C. to produce compound III;

B. treating 1 mole of compound III with 1 mole of sodium ethoxide and 1 mole of water, in absolute ethanol, in a temperature range of about 0° C. to about 25° C. to produce compound IV in which R is Na;

C. dissolving compound IV in glacial acetic acid, with the aid of heat, to produce compound V; and D. stoichiometrically oxidizing a solution of compound V in acetone with a solution of chromium trioxide, concentrated sulfuric acid and water at a temperature in the range of about −10° to 15° C. to produce compound I.

3. The process of claim 1 which comprises the consecutive steps of

A. treating 1 mole of compound II with 1.4 to 1.6 moles of ethyl chloroacetate and 1.4 to 1.6 moles of potassium tertiary butoxide, in t-butanol, in a temperature range of 0° to 25° C.; to produce compound III;

B. treating 1 mole of compound III with 1 mole of sodium ethoxide and 1 mole of water, in absolute ethanol, in a temperature range of about 0° C. to about 25° C., to produce compound IV in which R is Na;

C. dissolving compound IV in glacial acetic acid, at about reflux temperatures to produce compound V; and D. stoichiometrically oxidizing a solution of V in acetone with a solution of chromium trioxide, concentrated sulfuric acid and water at a temperature in the range of about 0° C. to about 5° C. to produce compound I.

4. The process of claim 1 which comprises the consecutive steps of

A. treating 1 mole of compound II with about 1.0 to 1.8 moles of ethyl chloroacetate and about 1.0 to 1.8 moles of potassium t-butoxide, in tertiary butanol, at a temperature in the range of about 0° C. to about 25° C. to produce compound III;

B. treating 1 mole of compound III with 1 mole of potassium tertiary butoxide and 1 mole of water, in t-butanol, in a temperature range of about 0° C. to about 25° C. to produce compound IV as a mixture in which R is K;

C. dissolving compound IV in glacial acetic acid, with the aid of heat, to produce compound V; and D. stoichiometrically oxidizing a solution of compound V in acetone with a solution of chromium trioxide, concentrated sulfuric acid and water at a temperature in the range of about 010° to 15° C. to produce compound I.

5. The process of claim 1 which comprises the consecutive steps of

A. treating 1 mole of compound II with 1.4 to 1.6 moles of ethyl chloroacetate and 1.4 to 1.6 moles of potassium tertiary butoxide, in t-butanol, in a temperature range of 0° to 25° C., to produce compound III;

B. treating 1 mole of compound III with 1 mole of potassium tertiary butoxide and 1 mole of water, in tertiary butanol, in a temperature range of about 0° C. to about 25° C., to produce compound IV as a mixture in which R is K;

C. dissolving compound IV in glacial acetic acid, at about reflux temperatures to produce compound V; and D. stoichiometrically oxidizing a solution of V in acetone with a solution of chromium trioxide, concentrated sulfuric acid and water at a temperature in the range of about 0° C. to about 5° C. to produce compound I.

6. The process of claim 1 which comprises the consecutive steps of

A. treating 1 mole of compound II with 1.4 to 1.6 moles of ethyl chloroacetate and 1.4 to 1.6 moles of potassium tertiary butoxide, in t-butanol, in a temperature range of 0° to 25° C., to produce compound III;

B. treating 1 mole of compound II in situ with 1 mole of potassium tertiary butoxide and 1 mole of water, in tertiary butanol, in a temperature range of about 0° C. to about 25° C., to produce compound IV as a mixture in which R is K;

C. dissolving compound IV in glacial acetic acid, at about reflux temperatures to produce compound V; and D. stoichiometrically oxidizing a solution of V in acetone with a solution of chromium trioxide, concentrated sulfuric acid and water at a temperature in the range of about 0° C. to about 5° C. to produce compound I.

* * * * *